B. J. CARTER.
FRICTIONAL TRANSMISSION MECHANISM.
APPLICATION FILED SEPT. 4, 1906.
983,349.
Patented Feb. 7, 1911.
2 SHEETS—SHEET 2.
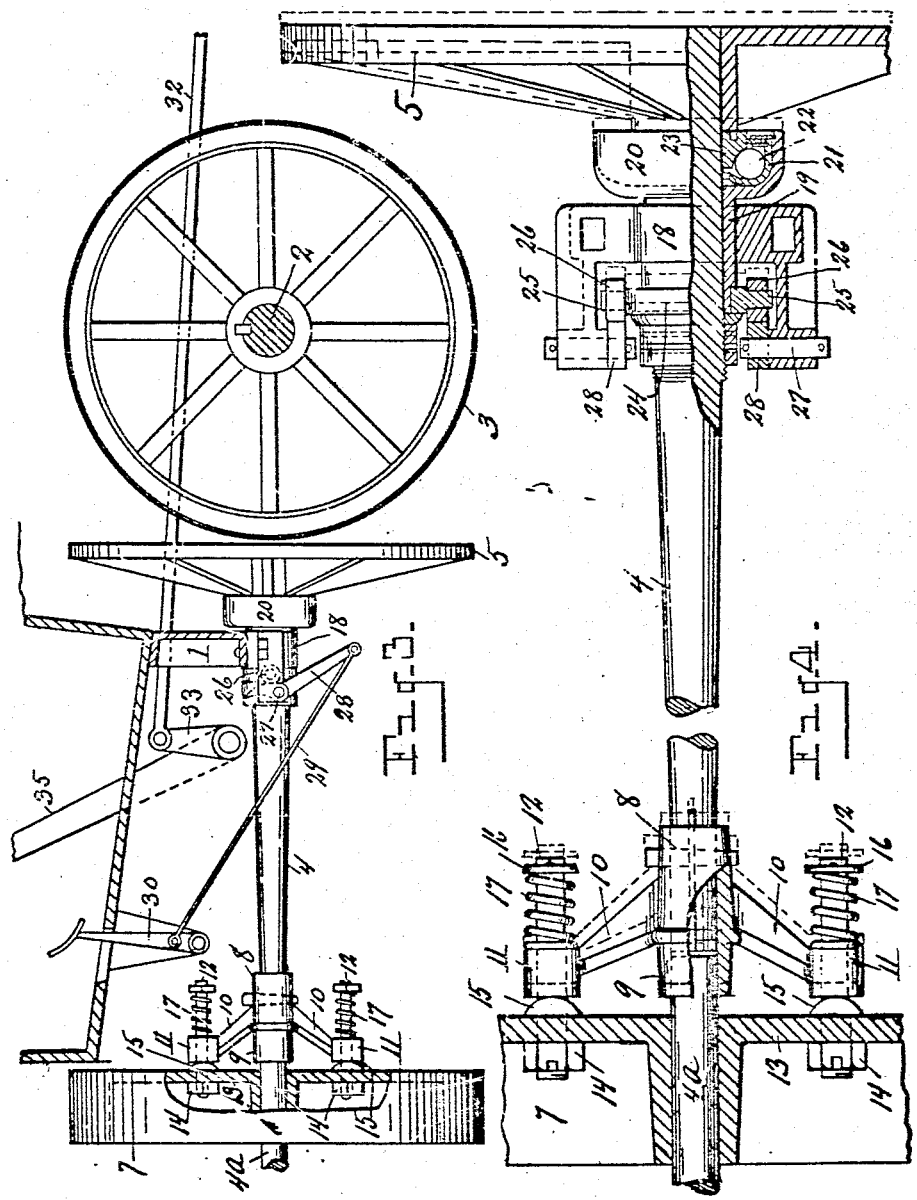
Witnesses:
O. B. Baenziger.
J. G. Hewlett.
Inventor:
Byron J. Carter.
By E. A. Wheeler & Co. attys.

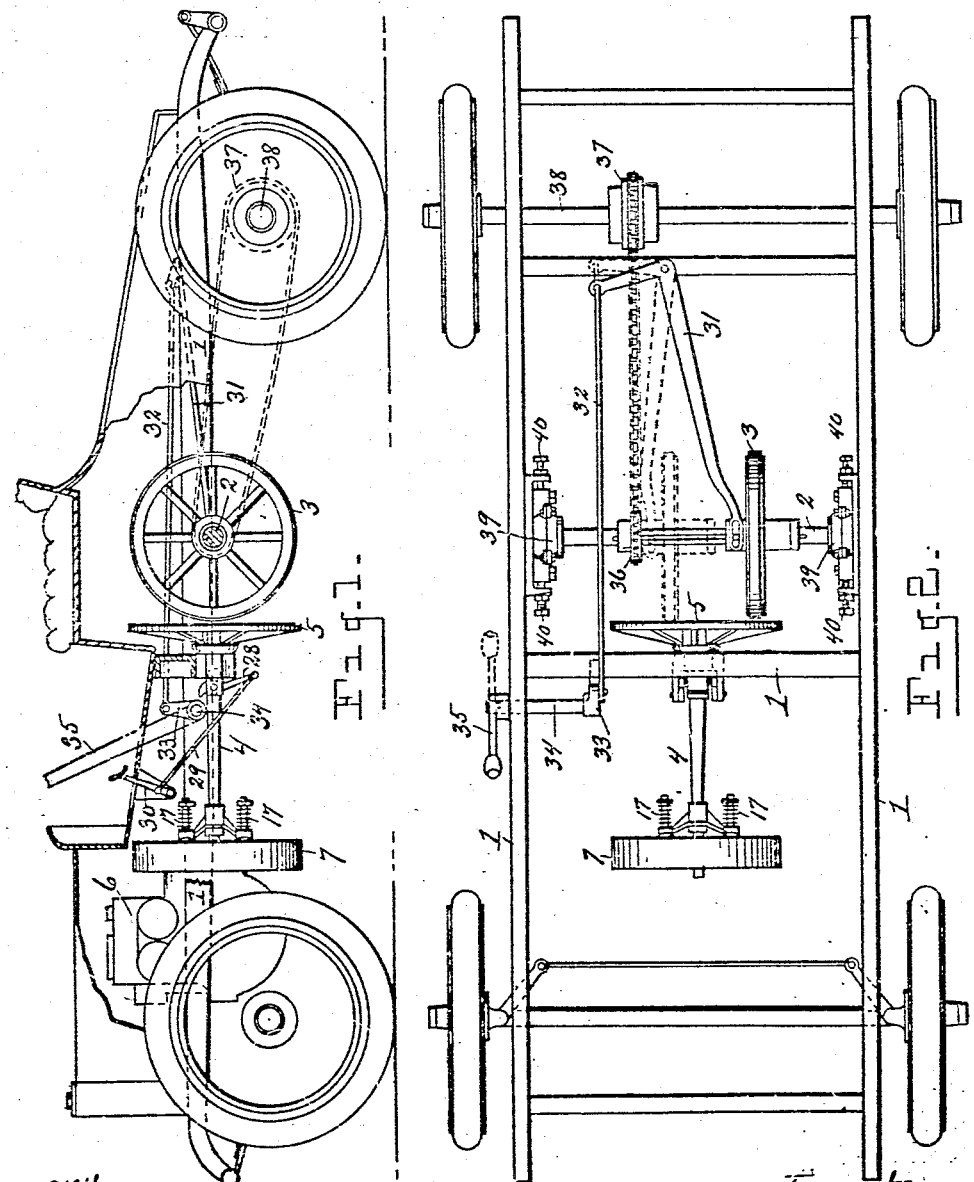

UNITED STATES PATENT OFFICE.

BYRON J. CARTER, OF DETROIT, MICHIGAN, ASSIGNOR TO MOTOR CAR CO., OF DETROIT, MICHIGAN, A CORPORATION OF MICHIGAN.

FRICTIONAL TRANSMISSION MECHANISM.

983,349.   Specification of Letters Patent.   Patented Feb. 7, 1911.

Application filed September 4, 1906. Serial No. 333,234.

*To all whom it may concern:*

Be it known that I, BYRON J. CARTER, a citizen of the United States, residing at Detroit, in the county of Wayne, State of Michigan, have invented certain new and useful Improvements in Frictional Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to frictional transmission mechanism, more especially designed for use in the propulsion of motor vehicles, and consists in the construction and arrangement of parts hereinafter fully set forth and pointed out particularly in the claims.

The object of the invention is to provide simple and efficient means for transmitting the power from the motor shaft to the driven shaft in an economical manner, and in providing for a movement of the frictional transmitting disk to enable it to be applied with the requisite pressure against the friction wheel on the driven shaft, the driven shaft being provided with means for maintaining it parallel with the face of the transmitting disk and the friction wheel on said shaft being rendered readily movable across the face of said disk.

The above object is attained by the structure illustrated in the accompanying drawing, in which:—

Figure 1 is a side elevation of the frame of a motor vehicle, partly in section, showing the application of my invention. Fig. 2 is a plan view of the chassis of a motor vehicle, showing my transmision mechanism mounted therein. Fig. 3 is an enlarged view partly in section, of said mechanism. Fig. 4 is an enlarged fragmentary view, showing the telescopic motor shaft, the transmitting disk on the end thereof, the ball thrust bearing at the rear of said disk and the shaft bearing through which the motor shaft slides longitudinally, together with the means for sliding said shaft.

Referring to the characters of reference, 1 designates the frame of a motor vehicle across which extends a transverse shaft 2. Splined upon said shaft is a friction wheel 3. The motor shaft 4 is journaled in the frame at right angles to the driven shaft 2. Upon one end of said motor shaft is the transmitting friction disk 5 whose friction face stands adjacent to the periphery of the friction wheel 3 on the shaft 2. To the opposite end of said shaft 4 the motor 6 is connected and upon said shaft adjacent to the motor is the usual fly wheel 7. The motor shaft is made telescopic by means of the sleeve 8 which is fixed to the longitudinally movable section thereof (see Fig. 4) and which extends onto and embraces, as at 9, the section of the motor shaft which is connected directly with the motor, thereby permitting a longitudinal reciprocation of that portion of shaft 4 which carries the transmitting disk 5. To provide for coupling the sections of the motor shaft in a manner to allow one portion thereof to reciprocate longitudinally as well as rotate, the sleeve 8 is provided with the laterally extending arms 10 having eyes 11 at their extremities through which pass the pins 12 which are seated in the web or spokes 13 of the fly wheel and receive on their inner ends the nuts 14, each of said pins having a shoulder or collar 15 thereon which engages the web or spokes of the fly wheel. Mounted upon each of the pins 12 between the eye 11 of the arm 10 and the collar 16 secured to the end of said pin, is a coiled spring 17 whose tension is normally exerted to hold the eyes 11 of the arms 10 against the collars 15 of the pins 12. The opposite end of the motor shaft is supported in a bearing box 18 suitably secured to the frame within which is a slidable non-rotative sleeve 19 through which said shaft passes and in which it rotates. On the outer end of said sleeve is a ball cup 20 having therein a raceway 21 in which are located the bearing balls 22 that are confined therein by the cone bearing 23 fixed to the shaft 4 to turn therewith, thereby forming a combined running and thrust bearing for the transmitting disk 5. Lying in an annular channel in the inner end of the sleeve 19 is a yoke or ring 24 having the projecting pins 25 on which are journaled the antifriction rollers 26. Fulcrumed on pins 27 mounted in the frame of the bearing 18 are the forks of the bifurcated eccentric lever 28 which bear against said antifriction rollers, the lower end of said lever being attached to the connecting rod 29 that leads to the foot lever 30. By operating said lever, the rod 29 will be drawn upon to carry the ends of the forks of the eccentric lever against the antifriction rollers 26 and move the sleeve 19 longitudinally, causing said sleeve to slide through the bearing 18 and carry with it the shaft 4 by means of the thrust bearing before described, whereby the disk 5 is caused to move into forcible contact with the periphery of the wheel 3. To accommodate said longitudinal movement of the forward section of the driving shaft, the springs 17 contract and the sleeve 9 slides over the motor section 4ᵃ of said shaft, as shown by dotted lines in Fig. 4. Upon the release of the foot lever, the springs 17 will retract section 4 of the motor shaft and withdraw the transmitting disk from engagement with the periphery of the wheel 3. The power exerted through the eccentric levers 28 and the foot lever 30 enables the transmitting disk to be carried with sufficient force against the wheel 3 to prevent slipping.

To slide the wheel 3 upon the driven shaft across the face of the disk 4, a bell crank lever 31 is employed, the longer end of which engages in a suitable manner the hub of wheel 3 and the shorter end of which is coupled to one end of a connecting rod 32 whose opposite end is attached to a crank 33 on a rock shaft 34 adapted to be actuated by a lever 35. Through the operation of said lever the wheel 3 may be carried across the face of the disk to vary the speed of the driven shaft, or reverse the direction of rotation thereof, as shown by dotted lines in Fig. 2. Upon the driven shaft is a sprocket wheel 36 connected by a sprocket chain with the differential gear 37 on the rear axle 38.

The bearing boxes 39 which support the ends of the shaft 2 are made laterally adjustable by means of the adjusting screws 40 which engages the opposite ends thereof, whereby said shaft may be brought into parallel relation with the face of the disk 5. As the arrangement for adjusting the bearing boxes 39 is more clearly set forth in a companion application executed on even date herewith, such structure need not be more fully set forth herein.

Having thus fully set forth my invention, what I claim as new and desire to secure by Letters Patent, is:—

1. In a transmission mechanism, the combination of a sectional motor shaft, a wheel thereon, guide pins extending from said wheel, a section of the motor shaft being longitudinally movable, a sleeve upon said movable section embracing the end of the other portion of the shaft to maintain said sections in alinement, lateral arms projecting from the longitudinally movable portion of the shaft through which said pins pass and which are slidable upon said pins, a spring upon each of the pins confined between the end thereof and said slidable arm, and means for sliding the longitudinally movable portion of said shaft against the action of said springs.

2. In a transmission mechanism, the combination of a motor shaft formed of two sections, one of which is longitudinally movable, a telescopic joint connecting said sections, a spring for returning the longitudinally movable section of the shaft after being extended, a collar embracing the shaft within which the shaft rotates, said collar having projections thereon, eccentric levers engaging said projections and having fixed fulcrums, and means for actuating said eccentric levers.

3. In a transmission mechanism, the combination of a motor shaft in two sections mounted to rotate in unison, one section of which is longitudinally movable, a friction disk on the longitudinally movable section of the motor shaft, a driven shaft, a friction wheel thereon which receives power from said disk, a slidable non-rotative sleeve through which passes the end of the movable section of the motor shaft carrying said disk, a bearing cup on the outer end of said sleeve, a cone upon the movable section of the motor shaft within said cup, balls interposed between the cup and cone, antifriction rollers at the outer end of said sleeve, a lever engaging said rollers, and means for actuating said lever.

4. In a transmission mechanism, the combination of a motor shaft formed in two sections, a number upon the non-slidable movable, a telescopic point connecting said sectiones, a member upon the non-slidable portion of said shaft having projecting pins which lie parallel with the axis of said shaft, radial arms on the slidable portion of said shaft having a slidable engagement with said pins, springs upon said pins interposed between the ends thereof and said arms on the slidable portion of said shaft, and means for moving the slidable section of said shaft against the action of said springs.

5. In a transmission mechanism, the combination of a sectional motor shaft, one section of which is longitudinally slidable, a member upon the non-slidable portion of said shaft, pins projecting from said member parallel with the axis of said shaft, a sleeve upon the longitudinally movable section of said shaft, said sleeve embracing the end of the other portion of the shaft to maintain the sections of the shaft in alinement, radial arms projecting from said sleeve, their outer ends being slidably mounted on said pins, a spring upon each of the pins confined between the end thereof and the end of one of said arms, and means for sliding the longitudinally movable portion of the shaft against the action of said springs.

In testimony whereof, I sign this specification in the presence of two witnesses.

BYRON J. CARTER.

Witnesses:
E. S. WHEELER.
I. G. HOWLETT.